April 7, 1959 P. A. JOYNER 2,881,056
GALVANIC CORROSION INDICATOR
Filed June 29, 1956

INVENTOR.
POWELL A. JOYNER
BY *(signature)*
ATTORNEY

United States Patent Office 2,881,056
Patented Apr. 7, 1959

2,881,056

GALVANIC CORROSION INDICATOR

Powell A. Joyner, Hopkins, Minn., assignor to Minneapolis-Honeywell Regulator Company, Minneapolis, Minn., a corporation of Delaware Application June 29, 1956, Serial No. 594,840

11 Claims. (Cl. 23—254)

The present invention relates to a condition responsive device for determining the extent of exposure of a device to a corrosive atmosphere. More specifically, the present invention relates to a device of this type which operates on galvanic principles and is useful for determining when a certain extent of corrosive conditions have been encountered by the test element. Accordingly, the present invention contemplates a galvanic battery and an associated circuit, the battery having a pair of dissimilar metals situated in closely spaced relationship defining a gap therebetween, and including conducting means electrically connecting said elements at a point removed from said gap. The device is further provided with a body of a humidity or other condition responsive conductive substance which is situated to bridge the gap between the galvanic elements or pair and thus provide a variable resistance path for conduction between the galvanic elements. In this connection, as the relative humidity or other corrosive inducing condition of the atmosphere in contact with said element increases, the conductivity of the bridging substance also increases and thereby permits galvanic current to flow more readily through the circuit. It is known that high humidities are largely responsible for inducing corrosion of metal parts and the like. It is further known that exposure to high relative humidities for even short periods of time can initiate corrosion or deterioration of many materials. It has previously been the practice to place relative humidity sensing or indicating apparatus in the various sealed enclosures in which materials are being stored. Upon reading the relative humidity in the enclosure, some indication of the corrosive conditions existing in the enclosure may be obtained. However, the rate of corrosion or deterioration of materials is influenced by temperature as well as by relative humidity. Generally the rate of corrosion is increased at higher temperatures for the same relative humidity. Consequently relative humidity indicating devices do not give entirely adequate indications of corrosive conditions. Further the relative humidity within sealed containers may fluctuate widely due to changes in ambient temperature such as may be caused from day to night. Thus, if a relative humidity reading of an enclosure is taken while the air within that enclosure is at a somewhat elevated temperature, the moisture present in the air under these conditions may not be sufficient to indicate an unsafe condition. If the temperature is permitted to drop within the enclosure without a change of air, the moisture present may then be sufficient to cause a high value of relative humidity or even condensation to occur at the lower temperature and cause an unsafe condition to occur. The device of the present invention is adapted to continuously function according to the relative humidity and temperature existing in the surrounding atmosphere, and to indicate when a certain degree of exposure to corrosive conditions has been exceeded.

It is well known that the extent of corrosion which occurs due to galvanic action is a function of the total electrical charge which is permitted to flow or dissipate in the galvanic circuit. Accordingly, the metal body of the galvanic pair which occupies the highest relative position in the electromotive force series of elements is oxidized and thereby physically disrupted due to the galvanic action, and a measure of the degree of oxidation of that particular body will provide a measure of the extent to which the device has been exposed to corrosive or humid atmospheres. Such a device may be designed to rupture after virtually any specified duration of exposure to any given relative humidity and temperature condition as determined by means of an external check on the expendable or destructable member of the galvanic pair. In addition, a plurality of expendable elements may be provided on the same blank so as to decompose serially, thus providing an integrated measure of the degree to which the device has been exposed to humid or corrosive atmospheres.

Among the variables involved in designing an element for rupture after certain durations of exposure are the electrode spacing, the thickness of the expendable element, the composition of the electrolyte and associated relative humidity sensitive coating, and the choice of the electrode materials utilized. Thus, if the electrode spacing is relatively close, the rate of decomposition or rupture of the expendable element occurs rather rapidly. In similar manner, the thickness of the expendable element influences the time required for rupture. In connection with the electrolyte used, it will be clear that a more highly ionized electrolyte provides a lower resistance path between the members of the galvanic cell under given conditions and hence permits more rapid rupture of the expendable element in the galvanic pair. Of course, the remaining variable which is the choice of electrode materials utilized also has some bearing on the rate of rupture of the galvanic member. If materials are utilized which are relatively closely spaced in the electromotive force series of elements, the rate of rupture will be relatively slow as compared to a pair of galvanic members selected from widely spaced elements in the series.

It is therefore an object of the present invention to provide a condition responsive device which will indicate the extent to which the device has been exposed to a humid or corrosive atmosphere.

It is an additional object of the present invention to provide a galvanic corrosion indicator wherein the rate of galvanic action is a function of the relative humidity and temperature of the surrounding atmosphere, and wherein external measuring means are provided to indicate the extent of decomposition of the expendable member of the galvanic pair.

It is still a further object of the present invention to provide a galvanic corrosion indicator wherein the rate of galvanic action is a function of the relative humidity and temperature of the surrounding atmosphere, and wherein a plurality of expendable elements are provided to decompose serially and thus indicate the degree of exposure to corrosive atmospheres.

Other and further objects of the present invention will become apparent to those skilled in the art upon a study of the following specification, claims and appended drawings, wherein:

According to the preferred modification of the present invention, a corrosion indicator 10 is provided wherein there is included a base mounting member 11 having a galvanic pair including elements or members 12 and 13 mounted thereon. It will be appreciated that the galvanic members 12 and 13 are formed of dissimilar metals such as copper and zinc respectively, these metals occupying relatively different levels in the electromotive force series of elements and being arranged on the mounting base so as to provide for generation of a galvanic current.

Figure 6:
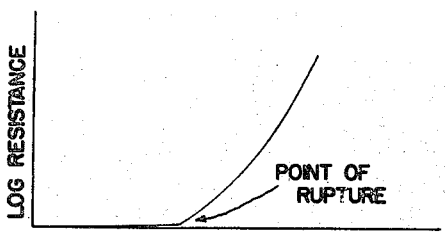
Figure 6 is a graph plotting resistance versus time of exposure to a corrosive atmosphere illustrating the sharp rise in electrical resistance measured across the expendable member upon rupture thereof.

Many combinations of metallic pairs will be readily apparent to those skilled in the art, and it is understood that the particular materials utilized are not particularly critical. It is preferable, however, that at least one of the members be selected from the group of elements situated below hydrogen in the electromotive force series of elements. The galvanic members are spaced relative to one another and thereby form a zone or gap 14 which represents the shortest path existing between the members. Electrical conductors 15 and 16 are provided to the members 12 and 13 at a point removed from the gap 14 so as to provide a relatively low resistance external path for the energy generated in the galvanic circuit in the region of the gap 14. In order to complete the electrical connection between the elements 12 and 13, particularly at the zone or gap 14, there is provided a body 15 of humidity or corrosive atmosphere sensitive electrically conductive material which bridges the gap and makes contact with the individual members 12 and 13. Although other combinations are suitable and will be readily apparent to those skilled in the art, this body is preferably composed of a solid mixture of polyvinyl alcohol and a hygroscopic salt such as zinc chloride or the like. It is well known that mixtures of this type are normally hygroscopic in nature and have a resistivity which is a function of the relative humidity of the contacting atmosphere. Thus, when a humid or corrosive atmosphere has been in contact with the device for a sufficient period of time, the expendable member 13 corrodes to the extent that a rupture occurs in the body of the member. At this time and thereafter, a test circuit which includes a source of power 17, a switch 18, a metering indicator 19 such as a volt meter or ohm meter and conductors 16 and 20 may be utilized to check the resistance across the expendable member. Reference is made to Figure 6 wherein there is shown graphically the abrupt increase in resistance which occurs upon rupture of the expendable element. When the element has been properly calibrated with respect to the conductivity of the bridging substance 15 and the expendable member 13, it may be readily determined when a certain extent of exposure to a corrosive atmosphere sufficient to cause rupture of the expendable member has been encountered by the device.

Figure 1:
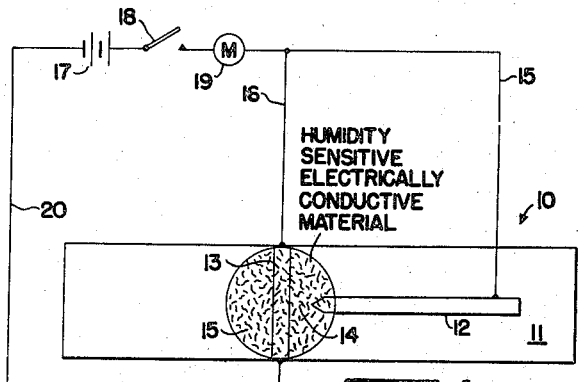
Figure 1 is a top plan view of a device prepared in accordance with the present invention and including a schematic drawing of the associated circuitry.
Figure 3:
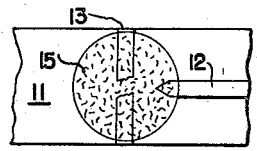
Figure 3 is a fragmentary top plan view showing the degree of corrosion and consequent rupture of the expendable member of the galvanic pair after exposure to corrosive conditions.
Figure 2:
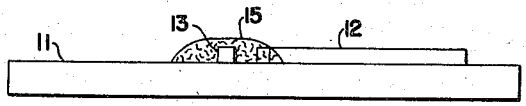
Figure 2 is a front elevational view of the device shown in Figure 1.
Figure 4:
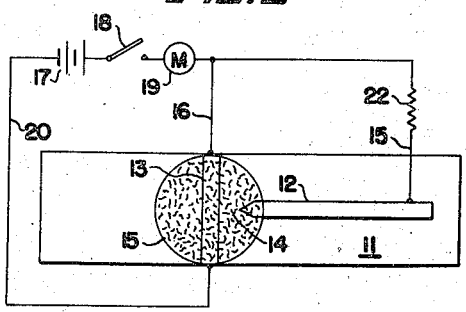
Figure 4 is a top plan view of a device similar to that shown in Figure 1, and including a schematic view of a modified circuitry arrangement.

Reference is made to Figure 4 wherein there is shown a modification of the device as shown in Figures 1 and 2. In this modification, a relatively high resistance element 22 is provided in the galvanic circuit. The use of such a resistor provides a more highly resistive galvanic circuit and a consequent slower rate of oxidation and disruption for the expendable element of the galvanic pair. Various values of resistance may be used depending on the desired rate of decomposition of the expendable member of the galvanic pair. Those skilled in the art will be able to determine the proper range of resistance for any given application of the element.

Figure 5:
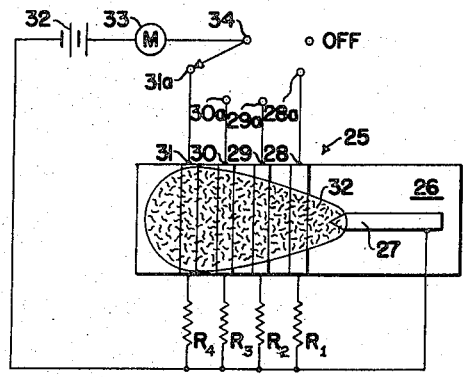
Figure 5 is a top plan view of a modified form of device prepared in accordance with the present invention and including a schematic diagram of its associated circuitry.

Attention is now directed to Figure 5 wherein there is disclosed still another modification of the present invention. Here there is shown a galvanic corrosion integrator 25 which includes a mounting base 26, a first galvanic member 27, and a plurality of expendable galvanic members 28, 29, 30 and 31. There is also provided a body of humidity or corrosive atmosphere sensitive electrically conductive material 32 which is similar to that shown at 15 in connection with Figures 1–4. In the galvanic circuitry, a plurality of fixed resistors R1, R2, R3 and R4 are provided connecting the external circuit existing between the first galvanic member 27 and the expendable members 28–31 respectively. In order to provide a measure of corrosive conditions over a relatively extended period of time, the values of resistances R1, R2, R3 and R4 may be varied in increasing manner in order that the time required for decomposition of member 28 is substantially less than that required for decomposition of member 29 etc. The values of resistance members R1, R2, R3 and R4 are selected so as to be somewhat less than the resistance encountered in a relatively short length of the electrically conductive material 32 such as is encountered in the gap between the various galvanic pairs. This is further essential in order that a rupture which may occur in the expendable members may be readily determined electrically. Of course, electrical continuity checking means are provided including a source of electrical potential 32 along with a meter 33 and a selector switch 34 which is adapted to make contact with the terminal points 28a, 29a, 30a, and 31a of the expendable members 28, 29, 30 and 31 respectively. Thus, the device will indicate when a certain degree of corrosion has taken place in the atmosphere to be tested according to the time period which is required for one or more of the expendable elements to rupture. In this manner, an integrated value of degree of corrosion may be readily determined. The switching arrangement as above disclosed is not essential when various resistances such as resistors R1, R2, R3 and R4 are utilized in the circuit. In this connection a reading may be taken across all of the expendable elements, this reading being taken across the elements in a parallel electrical arrangement. Upon rupture of one or more of the expendable members, the resistance value will be such that the reader will be readily able to determine how many, if any, of the elements have been ruptured at the time of the reading. An example of preparation of a device in accordance with the present invention follows.

*Example I*

A base mounting strip of polystyrene material was selected and a pair of galvanic members were mounted thereon. Copper was selected as the first member and a strip having a thickness of 1/10 mil was vacuum evaporated onto the face of the polystyrene base. A second galvanic member consisting of zinc was then vacuum evaporated onto the polystyrene base, the zinc member having a thickness of 1/10 mil and a width of 60 mils and being separated from the copper member by a distance of 1/8 inch at the closest point. To the portions of the galvanic members removed from the gap, an electrical conductor was attached in order to complete the galvanic circuit. A hygroscopic humidity sensitive electrically conductive material was then placed in position so as to bridge the galvanic elements, this body being prepared from a mixture of polyvinyl alcohol and zinc chloride, including 4% of zinc chloride. External checking means were then attached to the element at the extremities of the expendable member and the unit was ready for use.

*Example II*

An element similar to that described in Example I was prepared utilizing gold as a substitute for the copper galvanic element. Somewhat higher E.M.F. values are obtainable with this system over the copper-zinc pair.

Although various modifications of the present invention are disclosed in the specification herein, it will be understood that the illustrations are for purposes of clarifying the disclosure only and are not to be interpreted as any limitation on the scope of the present invention. Therefore, it will be understood that various other modifications of the present invention may be utilized without departing from the spirit and scope of the present invention.

I claim as my invention:

1. A condition responsive device for determining the extent of exposure to a certain corrosive atmosphere comprising a mounting base having a galvanic battery mounted thereon which includes a first galvanic member occupying one level in the electromotive force series of elements and at least one additional galvanic member which is above said first member in the electromotive force series, said galvanic elements being arranged in spaced relationship and defining a gap therebetween, external conduction means electrically connecting said galvanic members one to the other, a body of material electrically conductively sensitive to the presence of said corrosive atmosphere in contact therewith bridging said members and physically occupying said gap and arranged to control the rate of decomposition of said additional galvanic member, and means for determining the extent of galvanic decomposition of said additional galvanic member.

2. A condition responsive device for determining the extent of exposure to humid corrosive atmospheres which includes a mounting base having a galvanic battery mounted thereon, said battery having a first member which occupies one level in the electromotive force series and at least one expendable member occupying a position in said series above that of said first member and being positioned adjacent to said first member and defining a gap therebetween, electrical conduction means connecting said first and said second galvanic members, a hygroscopic humidity sensitive conducting body bridging said gap and in electrical contact with said galvanic members and arranged to control the rate of decomposition of the expendable member of the galvanic circuit, and means for determining the extent of galvanic decomposition of said expendable member.

3. A device as defined in claim 2 being further characterized in that electrical circuit means are provided for determining the physical continuity of said expendable member.

4. A condition responsive device for determining extent of the exposure to humid corrosive atmospheres including a mounting base having a galvanic battery mounted thereon, said battery including an elongated tapered first member which occupies one level in the electromotive force series, and at least one expendable member occupying a position in the said series above that of said first member being arranged in the plane of said first member and substantially normal thereto and having a point intermediate the ends thereof positioned adjacent to a terminal tip of said elongated tapered first member and defining a gap therebetween, electrical conduction means connecting said first and said second galvanic members at a point removed from said gap, a humidity sensitive conducting body bridging said gap and in electrical contact with said galvanic members and arranged to control the conductivity of the galvanic circuit and the rate of decomposition of said expendable member, and electrical means for determining the physical continuity of said expendable member.

5. A condition responsive device for determining the extent of exposure to a humid corrosive atmosphere including a mounting base having a galvanic battery mounted thereon which includes a first galvanic member occupying one level in the electromotive force series and at least one additional galvanic member which is above said first member in said series, said galvanic elements arranged on said base in spaced relationship and defining a gap therebetween, external conduction means electrically connecting said galvanic members one to the other at a point removed from said gap, hygroscopic means including a body of polyvinyl alcohol having a quantity of zinc chloride dissolved therein bridging said elements and occupying said gap, said hygroscopic means controlling the rate of decomposition of said additional galvanic member, and means for determining the extent of decomposition of said additional galvanic member.

6. A condition responsive device for determining the extent of exposure to humid corrosive atmospheres including a mounting base having a galvanic battery mounted thereon, said battery having a first copper body and at least one zinc body positioned adjacent thereto and forming a gap therebetween, electrical conduction means connecting said copper and zinc bodies at a point removed from said gap, a humidity sensitive hygroscopic conducting body including a zinc electrolyte bridging said gap and arranged to vary the conductivity of the galvanic circuit in electrical contact with said galvanic members, and electrical means for determining the physical continuity of said zinc bodies.

7. A condition responsive device for determining the extent of exposure to humid corrosive atmospheres including a mounting base having a galvanic battery mounted thereon, said battery having an elongated tapered first member prepared from a substance which occupies a certain level in the electromotive force series of elements and at least one additional elongated expendable member and substantially normal thereto situated adjacent to said first member and forming a gap therebetween, at least one of said members being situated below hydrogen in the electromotive force series of elements, electrical conduction means connecting said first and said second galvanic members at a point removed from said gap, a humidity sensitive conducting body containing a certain electrolyte bridging said gap and arranged to vary the conductivity of the galvanic circuit in electrical contact with said galvanic members the cation portion of said electrolyte corresponding to the substance of said expendable member, and means for determining the physical continuity of said expendable member.

8. A condition responsive device for determining the extent of exposure to humid corrosive atmospheres including a mounting base having a galvanic battery mounted thereon, said battery having a first member which occupies one level in the electromotive force series and at least one expendable member occupying a position in said series above that of said first member arranged adjacent to said first member and defining a gap therebetween, electrical conduction means defining a resistive path between said first and said second galvanic members, a humidity sensitive conducting body bridging said gap, contacting said members, and arranged to vary the conductivity of the galvanic circuit and thereby control the rate of decomposition of said expendable member, and means for determining the physical continuity of said expendable member.

9. A condition responsive device for determining the extent of exposure to corrosive atmospheres including a galvanic battery having a first member which occupies one level in the electromotive force series and a plurality of expendable members occupying positions in said series above that of said first member situated in spaced relationship one from the other and from said first member and defining a gap therebetween, electrical conduction means connecting said first member to said expendable members at a point removed from said gap, a humidity sensitive conducting body bridging said gap and in electrical contact with said galvanic members and arranged to vary the conductivity of the galvanic circuit, and electrical means for determining the physical continuity of said expendable member.

10. The device of claim 9 being further characterized in that resistors are provided in said electrical conduction means between said first galvanic member and said expendable members.

11. A condition responsive device for determining the extent of exposure to corrosive atmospheres including a galvanic battery having a first elongated member which occupies one position in the electromotive force series (EFS) and a plurality of expendable members occupying positions in said series above that of said first member being situated in spaced relationship, one from another, and from said first member, said expendable members being situated substantially parallel to one another and substantially normal to said first member, and defining a gap therebetween, electrical conduction means connecting said first member to said expendable member at a point removed from said gap, a humidity sensitive conducting body bridging said gap and in electrical contact with said galvanic members and arranged to vary the conductivity of the galvanic circuit, and electrical means for determining the physical continuity of said expendable member.

References Cited in the file of this patent

UNITED STATES PATENTS

| | | |
|---|---|---|
| 2,681,571 | Becher | June 22, 1954 |
| 2,716,229 | Wehrmann et al. | Aug. 23, 1955 |
| 2,735,754 | Dravnieks | Feb. 21, 1956 |
| 2,762,036 | Triman | Sept. 4, 1956 |
| 2,804,593 | Eicken | Aug. 27, 1957 |